US010137627B2

(12) United States Patent
Lahogue et al.

(10) Patent No.: US 10,137,627 B2
(45) Date of Patent: Nov. 27, 2018

(54) UNIT FOR PROCESSING BLANKS PROVIDED WITH AN OPTICAL CONFINEMENT SECTION HAVING CONVERGENT WALLS

(71) Applicant: SIDEL PARTICIPATIONS, Octeville sur Mer (FR)

(72) Inventors: Yoann Lahogue, Octeville sur Mer (FR); Guy Feuilloley, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 248 days.

(21) Appl. No.: 15/127,311

(22) PCT Filed: Feb. 4, 2015

(86) PCT No.: PCT/FR2015/050267
§ 371 (c)(1),
(2) Date: Sep. 19, 2016

(87) PCT Pub. No.: WO2015/140424
PCT Pub. Date: Sep. 24, 2015

(65) Prior Publication Data
US 2017/0136682 A1 May 18, 2017

(30) Foreign Application Priority Data

Mar. 19, 2014 (FR) ...................... 14 52296

(51) Int. Cl.
B29C 49/68 (2006.01)
B29B 13/02 (2006.01)
(Continued)

(52) U.S. Cl.
CPC ............ B29C 49/68 (2013.01); B29B 13/024 (2013.01); B29C 35/0805 (2013.01);
(Continued)

(58) Field of Classification Search
CPC . B29C 49/68; B29C 49/6472; B29C 49/6418; B29C 35/0805;
(Continued)

(56) References Cited

U.S. PATENT DOCUMENTS

2008/0099961 A1* 5/2008 Feuilloley ............. B29B 13/024
264/405
2010/0127435 A1* 5/2010 Feuilloley ........... B29C 49/6436
264/492

(Continued)

FOREIGN PATENT DOCUMENTS

EP     2 623 439 A1   8/2013
EP     2 544 877 B1   1/2014
(Continued)

OTHER PUBLICATIONS

International Search Report, dated Apr. 29, 2015, from corresponding PCT Application.

*Primary Examiner* — Joseph S Del Sole
*Assistant Examiner* — Lawrence D. Hohenbrink, Jr.
(74) *Attorney, Agent, or Firm* — Young & Thompson

(57) ABSTRACT

The unit (1) for processing hollow-body plastic blanks (2) includes a chamber (6) wherein the blanks (2) move along a predetermined path. The chamber (6) is defined, on both sides of the path, by two side walls (3, 4) having inner surfaces (5) that face each other. The chamber (6) includes a main section (9) wherein at least one of the walls (3, 4) is provided with a plurality of electromagnetic radiation sources (10). The side walls (3, 4) define therebetween, on at least one end of the chamber, an opening (8) for the preforms to pass therethrough. The chamber (6) includes at least one optical confinement section (12) that extends between the main section (9) and the opening (8) and
(Continued)

wherein the inner surfaces (5) of the side walls (3, 4) are optically reflective and converge toward the opening (8).

14 Claims, 6 Drawing Sheets

(51) Int. Cl.
| | |
|---|---|
| *B29C 49/64* | (2006.01) |
| *B29C 35/08* | (2006.01) |
| *B29C 49/12* | (2006.01) |
| *B29C 35/02* | (2006.01) |
| *B29C 49/06* | (2006.01) |
| *B29K 67/00* | (2006.01) |
| *B29K 105/00* | (2006.01) |
| *B29L 31/00* | (2006.01) |

(52) U.S. Cl.
CPC .......... *B29C 49/12* (2013.01); *B29C 49/6418* (2013.01); *B29C 49/6472* (2013.01); *B29C 49/06* (2013.01); *B29C 2035/0283* (2013.01); *B29C 2035/0822* (2013.01); *B29C 2035/0827* (2013.01); *B29C 2035/0838* (2013.01); *B29K 2067/003* (2013.01); *B29K 2105/258* (2013.01); *B29L 2031/7158* (2013.01)

(58) Field of Classification Search
CPC .... B29C 2035/0283; B29C 2035/0822; B29C 2035/0827; B29C 2035/0838; B29B 13/024
USPC ..... 425/174.4, 528, 534; 264/482, 492, 535, 264/538
See application file for complete search history.

(56) References Cited

U.S. PATENT DOCUMENTS

| | | | |
|---|---|---|---|
| 2010/0230863 A1* | 9/2010 | Moench | ............... B29B 13/024 264/405 |
| 2013/0056649 A1* | 3/2013 | Feuilloley | ............... B29C 49/68 250/455.11 |
| 2013/0192956 A1 | 8/2013 | Lahogue et al. | |
| 2014/0305919 A1 | 10/2014 | Bellec et al. | |

FOREIGN PATENT DOCUMENTS

| | | |
|---|---|---|
| FR | 2 878 185 A1 | 5/2006 |
| FR | 2 915 418 A1 | 10/2008 |
| WO | 2008/075280 A1 | 6/2008 |
| WO | 2013/076415 A1 | 5/2013 |

\* cited by examiner

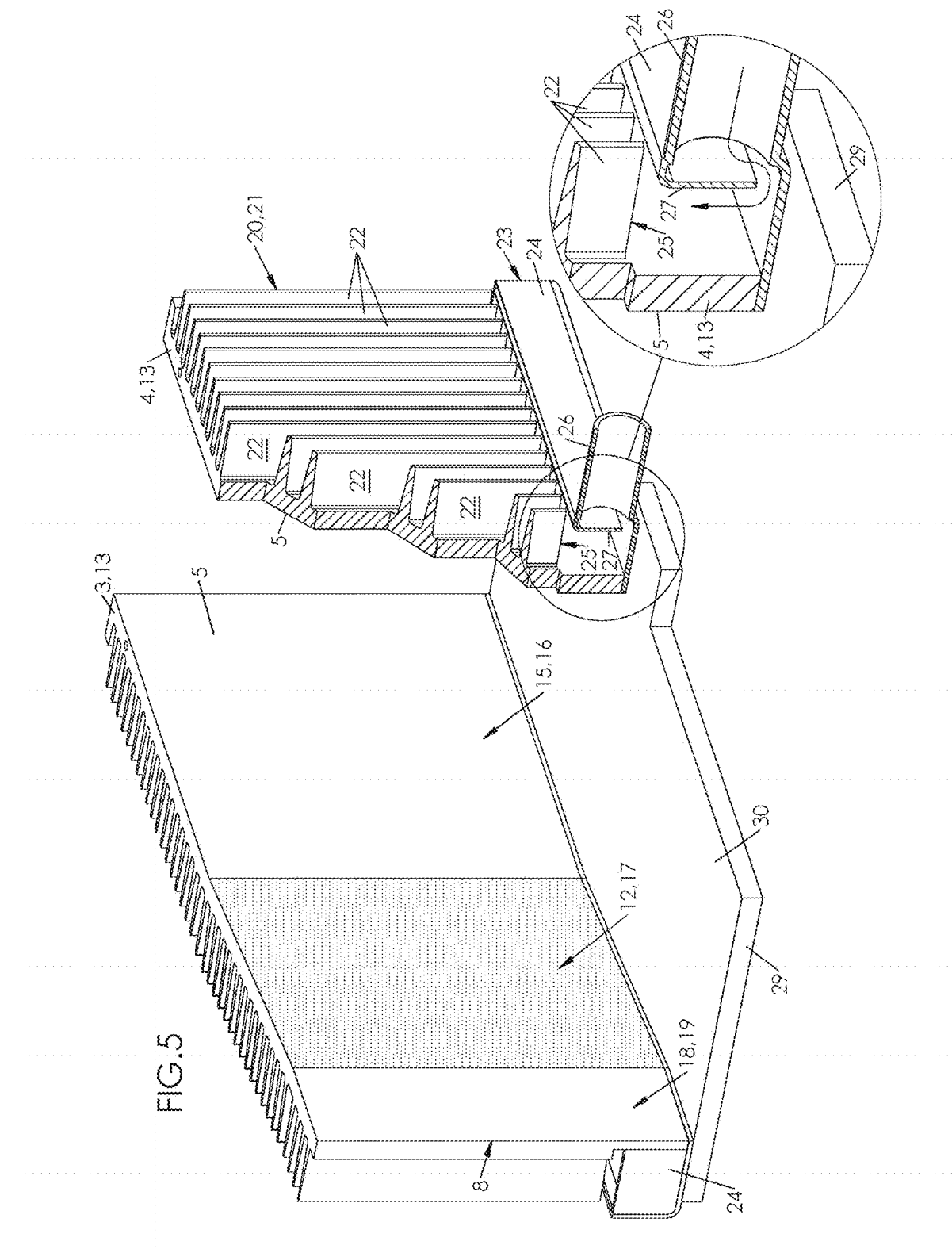

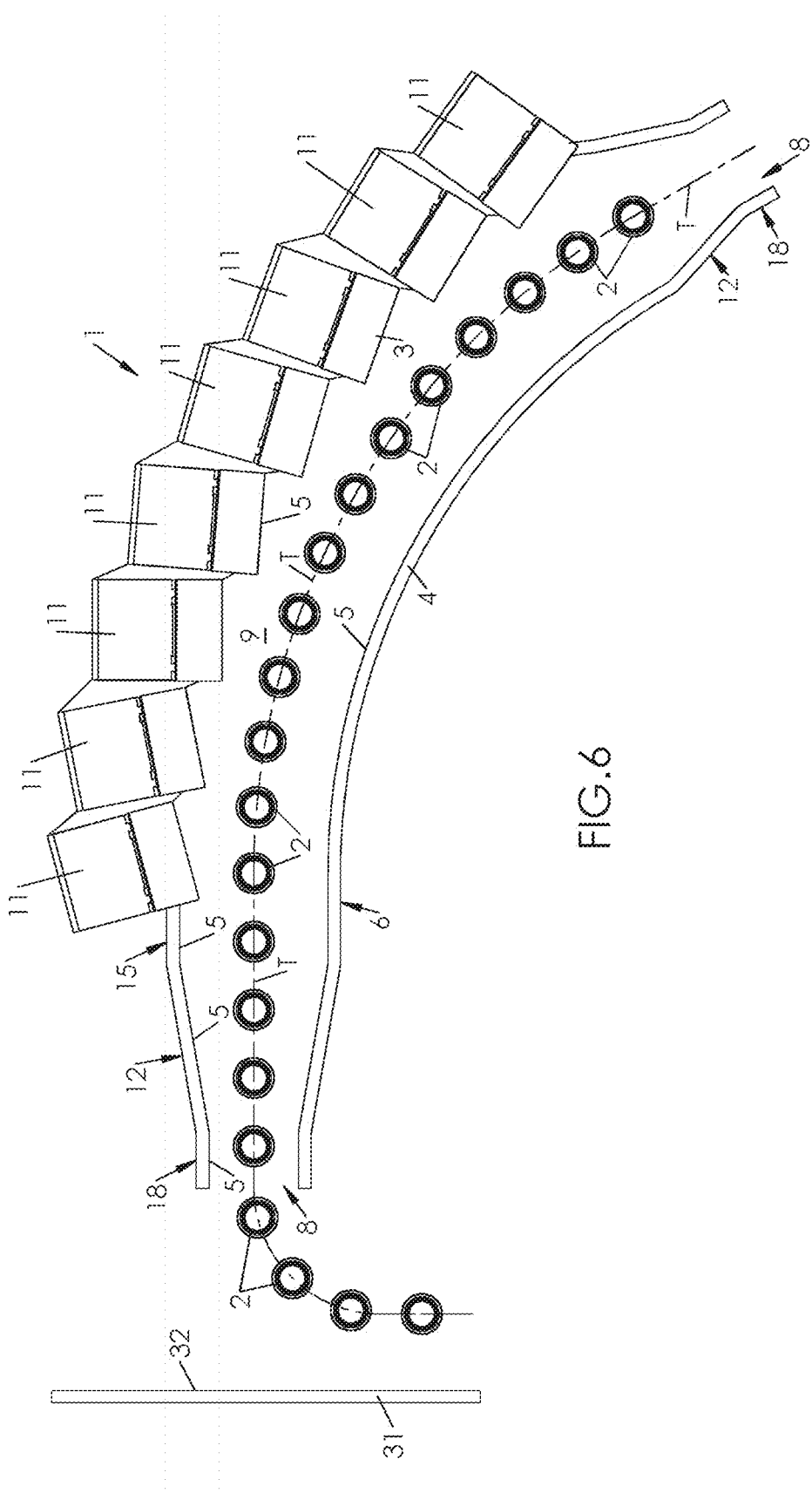

UNIT FOR PROCESSING BLANKS PROVIDED WITH AN OPTICAL CONFINEMENT SECTION HAVING CONVERGENT WALLS

The invention relates to the manufacturing of hollow bodies such as containers, by blow molding or stretch-blow molding from blanks of plastic material.

The term "blank" refers to a preform, obtained by injection of a plastic material into a mold, or an intermediate hollow body obtained from a preform that has undergone at least one first forming operation and is intended to be subjected to at least one second forming operation.

The invention relates more specifically to the processing, for example thermal (heat) or for decontamination, of the blanks. The processing of the blanks is generally performed online within a processing unit (currently called "oven" in the case of the heating), provided with numerous sources of electromagnetic radiation, in front of which the blanks that are driven in rotation about themselves file past.

If the standard technique for heating blanks by means of tubular halogen-type incandescent bulbs that radiate according to Planck's law over a continuous spectrum remains to date the most widely used, an alternative technology has recently emerged, based on the use of monochromatic or pseudo-monochromatic electromagnetic radiation sources (particularly lasers), the emission spectrum of which extends essentially in the infrared range (see the French patent applications FR 2 878 185 and FR 2 915 418 in the name of the applicant).

The performance and the properties (particularly of optical precision) of laser heating, greater than those of halogen heating, make it possible to achieve a more rapid and more selective heating of the blanks.

However, it is necessary to confine as much as possible the chamber within which the blanks advance, to limit as far as possible the radiation leakage, particularly since it is not visible. This confinement, however, is complicated by the need to provide for the openings at the entry and at the exit of the chamber to allow the blanks to advance.

These openings are essential but represent, in the absence of a confinement solution, a risk of exposure to electromagnetic radiation for the workers moving around the processing unit.

Solutions have been proposed to provide a confinement of the chamber in the area of the openings, see, for example, the European patent EP 2 544 877 (Sidel) or its U.S. equivalent US 2013/0056649, which proposes juxtaposing with the chamber a tunnel equipped with turnstiles driven in rotation by the linear movement of the blanks, these turnstiles being provided with shields arranged in a star configuration designed to absorb the electromagnetic radiation coming from the chamber.

This solution is satisfactory for the most part but remains unsuitable for certain operating conditions. In particular, the turnstile tunnel is not suitable for an advance of the preforms in two rows, as described in the European patent application EP 2 623 439 (Sidel) or its U.S. equivalent US 2013/0192956. Of course, the tunnel could be offset upstream from the splitting zone of the row of preforms (or downstream from the regrouping zone of the preforms into a single row), but a lengthening of the radiative zone would result from it, at the expense of a good control of the processing (particularly thermal) of the blanks. Furthermore, the energy of the radiation absorbed by the shields is lost, which reduces the efficiency of the heating. In addition, because of their rotating movement, the shields are subject to successive heating and cooling cycles that cause a thermal fatigue of their material, which necessitates regular maintenance.

A first objective is to propose a solution for confinement of a unit for processing blanks by electromagnetic radiation, which is both simple and effective.

A second objective is to propose a solution for confinement that makes it possible to optimize the use of the radiation by minimizing the portion of radiation lost.

A third objective is to propose a solution for confinement that makes it possible to minimize maintenance actions.

A fourth objective is to propose a solution for confinement that exhibits a good resistance to thermal fatigue.

For this purpose, a unit is proposed for processing hollow-body blanks of plastic material, which comprises a chamber in which the blanks advance by following a predetermined pathway, this chamber being delimited on both sides of the pathway by two lateral walls having opposing inner faces, this chamber comprising a main section in which at least one of the walls is provided with numerous sources of electromagnetic radiation, the lateral walls defining between themselves, at at least one end of the chamber, an opening for the passage of the preforms, the chamber comprising at least one optical confinement section, which extends between the main section and the opening, and in which the inner faces of the lateral walls are optically reflective and converging in the direction of the opening.

The optical confinement section makes it possible to send back toward the main section at least one portion of the radiation that escapes from it. The effect of this is an increase in the efficiency of the chamber and better safety of it from the viewpoint of the workers in the vicinity.

Various additional characteristics can be foreseen, alone or in combination:
- in the optical confinement section, the inner faces of the lateral walls are flat;
- in the optical confinement section, the inner faces of the lateral walls define between them an angle of between 1° and 90°, preferably between 5° and 30°, and, for example, about 15°;
- the chamber comprises an absorption section, which extends between the optical confinement section and the opening, and in which the inner faces of the lateral walls are optically absorbent;
- in the absorption section, the inner faces of the lateral walls are approximately parallel;
- in the absorption section, the inner faces of the lateral walls are flat;
- the processing unit is provided with a device for cooling the lateral walls, at least within the confinement section;
- the cooling device comprises a radiator;
- the radiator comprises a row of fins that extend vertically on the lateral walls opposite their inner faces, at least within the confinement section;
- the cooling device comprises a ventilation system that includes, for each radiator, a distribution channel that extends along a lower edge of the radiator and opens toward it, and an air supply duct which empties into the channel;
- the sources are laser diodes;
- the processing unit comprises at least one screen outside of the chamber, having an optically absorbent inner face positioned opposite the opening.

Other objects and advantages of the invention will be brought out in the description of an embodiment, given below with reference to the accompanying drawings, in which:

FIG. 5 is a partial detached perspective view showing the optical confinement section;

FIG. 6 is a top view showing a processing unit illustrating several alternative embodiments.

Figure 1:
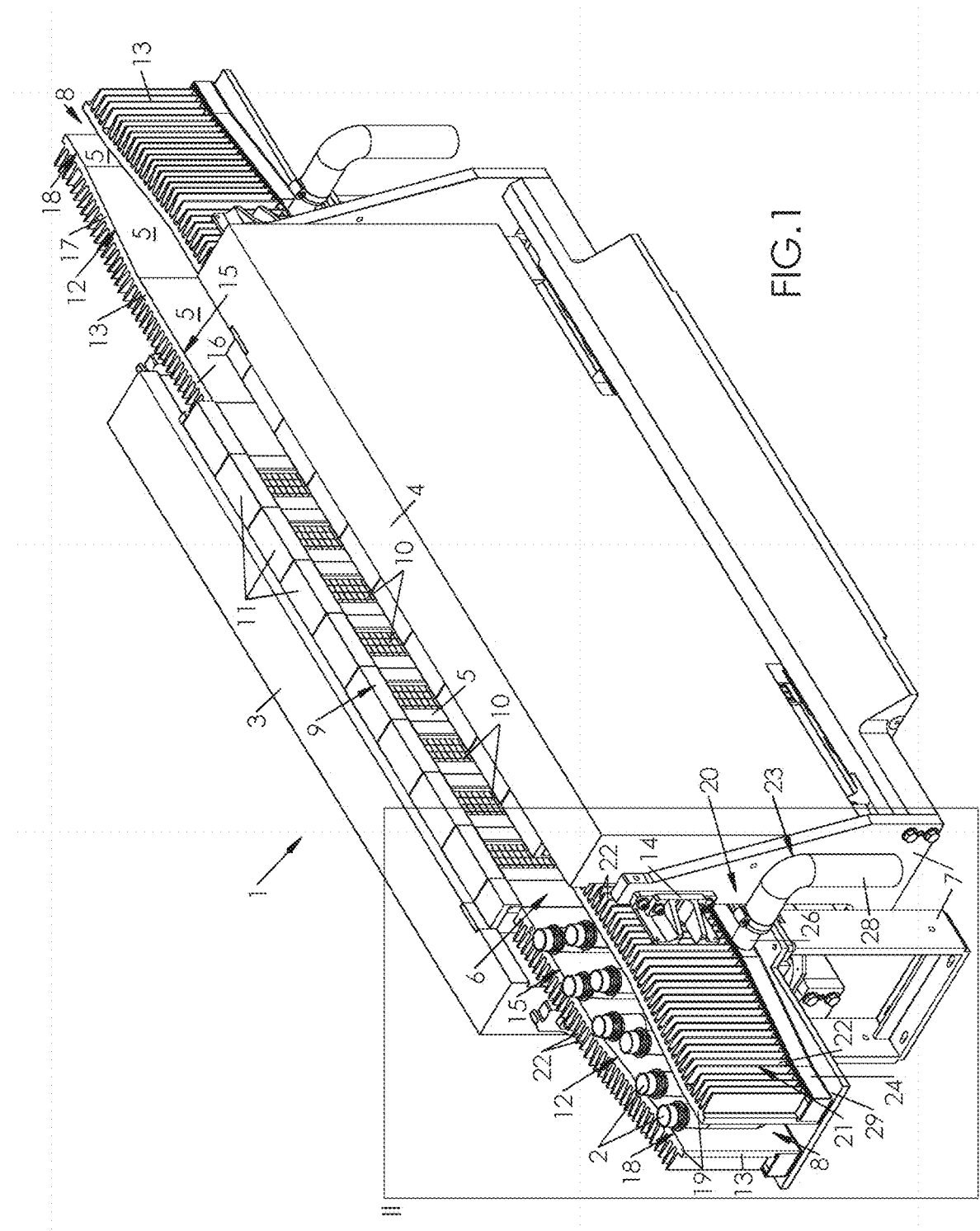
FIG. 1 is a perspective view of a unit for processing blanks.

A unit 1 for processing hollow-body blanks 2 of plastic material has been shown in the figures. In this case, the blanks 2 are preforms intended to form containers (a hypothesis that is preserved in what follows), but they could be intermediate containers that have been subjected to one or more preforming operations (for example, a preliminary blow molding).

Each preform 2 has an approximately cylindrical body, closed at one end by a hemispherical bottom and being extended at an opposite end by a neck.

The preforms 2 are shown oriented neck-up, but they could be oriented neck-down.

As can be seen in the figures, the processing unit 1 comprises two opposite walls, namely a first wall 3 and a second wall 4. The walls 3, 4 have opposite inner faces 5 and together define a chamber 6 within which the preforms 2 advance. As FIGS. 1 and 2 clearly show, the processing unit 1 comprises a frame 7 on which the walls 3, 4 are mounted.

Between them, at at least one end of the chamber, the lateral walls 3, 4 define an opening 8 for the passage of the preforms 2. In practice, the chamber 6 has (as illustrated in FIGS. 1 and 6) two opposite ends that each define an opening 8 for the passage of the preforms 2.

Each preform 2 is mounted by its neck on a rotating gripping device called a spinner, driven in movement at an approximately constant speed along the pathway.

Each preform 2 is driven in rotation around its axis by the spinner on which it is mounted.

The preforms 2 advance in the chamber 6 along a predetermined pathway T. In the example illustrated in FIGS. 1 to 5, this pathway is essentially linear, but it could be (at least in some areas) curved, particularly depending on the configuration of the places in which the processing unit 1 is set up. In the example illustrated in FIGS. 1 and 2, the preforms 2 enter into the chamber 6 in a single row and are split into two parallel rows while being arranged in a staggered manner. A transport system that makes it possible to perform such a local splitting is described in the application EP 2 623 439, whose contents are incorporated here by way of reference. In this case, pathway T is locally curved in the splitting zone, although it is essentially linear. In a variant, as illustrated in FIG. 6, the pathway T is curved, for example in an arc. As this figure clearly shows, the preforms 2 can furthermore advance in a single row.

The chamber 6 comprises a main section 9 in which at least one of the walls 3, known as an emitting wall, is lined on the side of its inner face 5 with numerous electromagnetic radiation sources 10 preferably emitting in a monochromatic or pseudo-monochromatic way, directed toward the interior of the chamber 6. According to a particular embodiment illustrated in the figures, the two walls 3, 4 are emitting.

If the processing of the preforms 2 is a thermal treatment (which can be referred to with the term "heating"), the sources 10 are chosen to emit in the infrared range. If the processing is decontamination, the sources 10 are chosen so that their spectrum covers the ultraviolet range, a germicide range. It can be pulsed light xenon vapor bulbs, or even diodes emitting in the ultraviolet range.

In theory, a monochromatic source is an ideal source that emits a single frequency sine wave. In other words, its frequency spectrum is made up of a single zero spectral ray width (Dirac).

In practice, such a source does not exist, an actual source being at best quasi-monochromatic, i.e., its frequency spectrum extends over a band of spectral width that is small but not zero, centered on a main frequency where the intensity of the radiation is at a maximum. By misuse of language, however, we are accustomed to refer to such an actual source as monochromatic. Furthermore, we refer to as "pseudo-monochromatic" a source emitting in a quasi-monochromatic way over a discrete spectrum comprising several narrow bands centered on distinct main frequencies. Reference is also made to a multi-mode source.

The advantage of such radiation is that it is concentrated on one (or more) frequency(ies) for which the thermal behavior of the material of the preforms 2 is particularly advantageous with regard to the specified requirements. By way of example, to obtain a rapid heating on the surface of the preforms 2, one (or more) frequency(ies) can be selected in the infrared range for which the material is very absorbent. Conversely, to obtain a slower but more homogeneous heating in the thickness of the preforms 2, one (or more) frequency(ies) can be selected for which the material is relatively less absorbent.

Hereinafter, it is assumed that the processing is heating, the processing unit 1 being in fact a heating unit (also called "oven"). In this application, each preform 2, made from a thermoplastic material such as polyethylene terephthalate (PET), is intended, after having been softened by heating within the oven 1 to a temperature greater than its glass transition temperature, to undergo in a mold an operation of blow molding or of stretch-blow molding to form a container such as a bottle or a flask.

Figure 2:
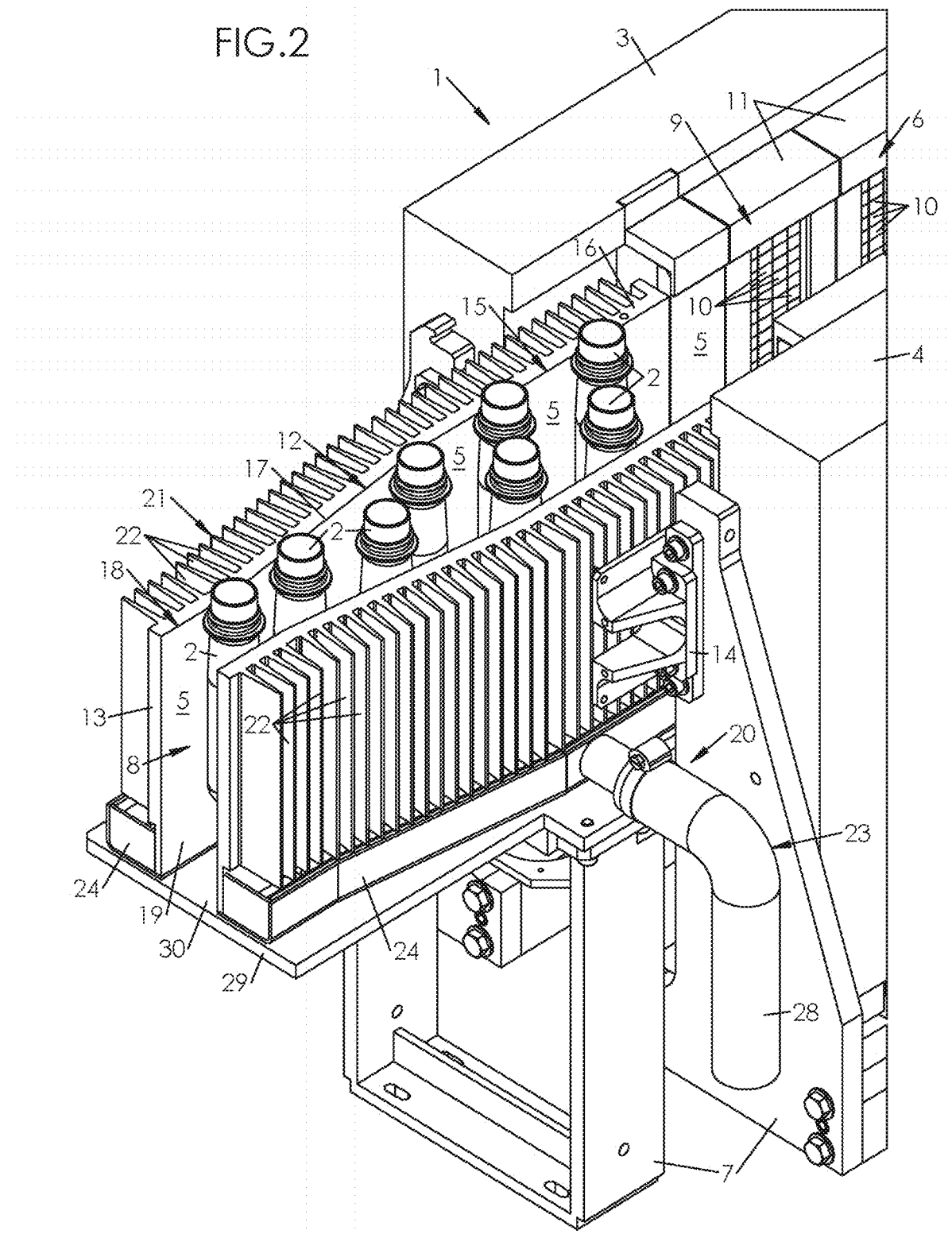
FIG. 2 is a detail view, on a larger scale, of the processing unit of FIG. 1, according to the insert II.
Figure 3:
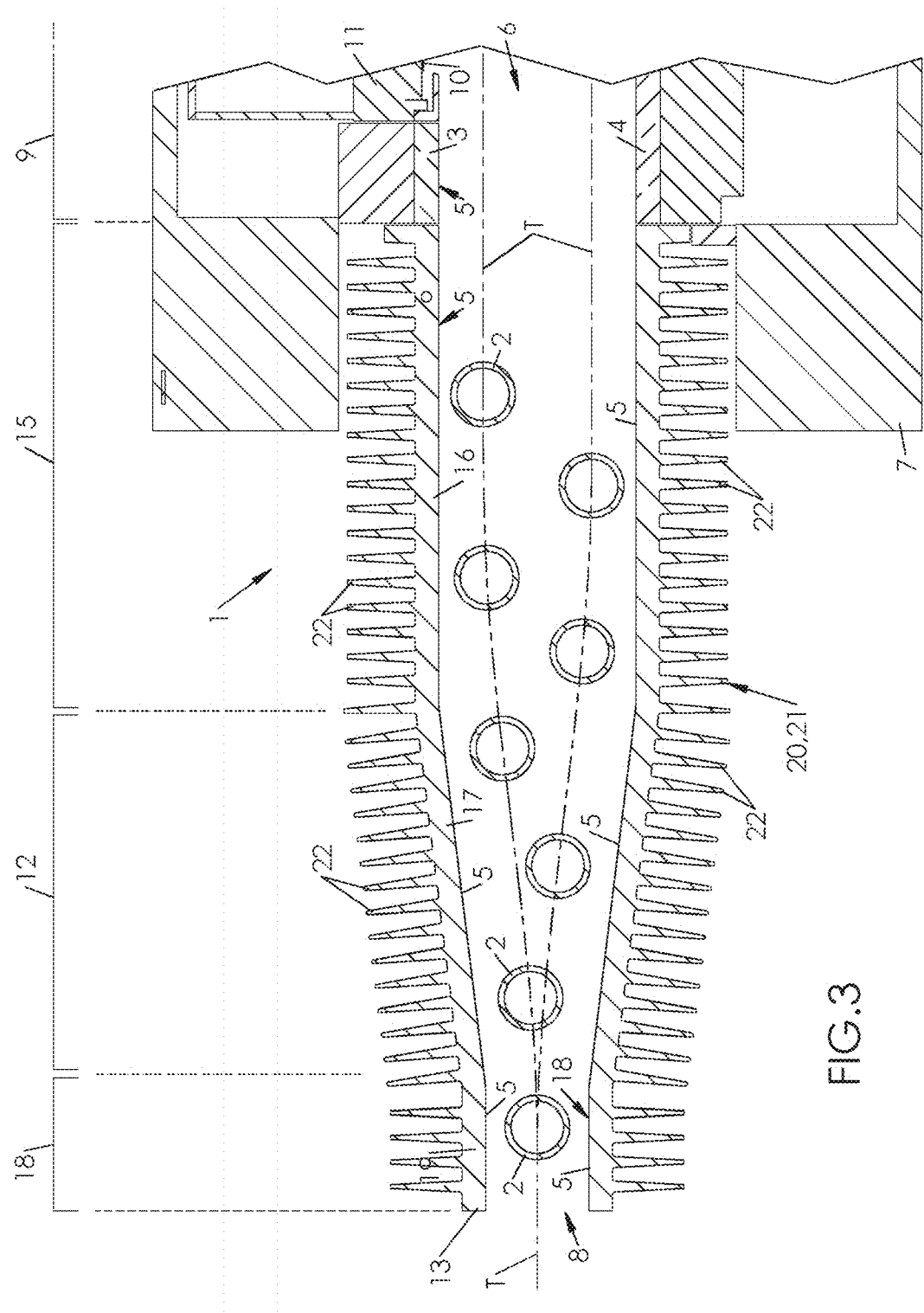
FIG. 3 is a partial top view of the processing unit of FIG. 1.

In practice, the sources 10 are lasers (for example laser diodes) that emit in the infrared range and are organized by juxtaposition and superposition to form one or more matrices, as is described in, for example, the international application WO 2013/076415, whose contents are incorporated here by way of reference. In this particular case, each matrix can be a matrix of vertical-cavity surface-emitting laser (VCSEL) diodes, each diode emitting, for example, a laser beam with a unit power on the order of a Watt at a wavelength of about 1 µm. In the example illustrated in FIGS. 1, 2 and 3 and 6, the oven 1 is provided with several matrices of diodes placed side by side along the chamber 6. These matrices are grouped here into individual heating modules 11 that, in the example of FIGS. 1, 2 and 3, are placed side by side while being aligned and, in the example of FIG. 6, are offset in the manner of a stairway to follow the pathway T of advance of the preforms 2. The modules 11 are integral with the frame 7 by being, for example, fastened there in a removable manner (to make possible their maintenance), typically by means of screws.

It is desirable to confine the electromagnetic radiation emitted by the sources 10, because a fraction of this radiation has a tendency to escape from the chamber 6: on the one hand, the sources 10 emit a diverging radiation (each VCSEL laser diode, for example, emits a radiation roughly inscribed in a cone); on the other hand, a portion of the radiation that is not absorbed by the preforms 2 undergoes a refraction because of the cylindrical shape of the preforms.

A confining of the radiation makes it possible, on the one hand, to improve the optical efficiency of the processing of the preforms 2 and, on the other hand, to protect the workers in the vicinity.

For this purpose, the chamber 6 comprises at least one optical confinement section 12, which extends between the main section 9 and the opening 8, and in which the inner faces 5 of the lateral walls 3, 4 are optically reflective and converging in the direction of the opening 8.

Ideally, the reflection is of the specular type, i.e., any incident ray gives rise, on contact with the inner face 5, to a single reflected ray. We will see below that, in practice, the reflection is not necessarily completely specular, but that a portion of the incident optical flow can result in a diffuse reflection and/or in absorption.

According to an embodiment illustrated in FIGS. 1 to 5, each lateral wall 3, 4 is formed, at least in the confinement section 12, by an attached screen 13.

Each screen 13 is fastened to the frame 7, for example by means of an angle bracket 14 screwed into it.

Each screen 13 is advantageously made of a material that is able to withstand a prolonged exposure to the electromagnetic radiation coming from the main section 9 of the chamber 6, typically of steel or an aluminum alloy.

In the optical confinement section 12 (shaded in FIG. 5), the inner faces 5 of the lateral walls 3, 4 are advantageously flat; they can be covered with a reflective coating (for example in the form of a fine metallic layer of gold, silver, platinum, or even aluminum). In a variant, the inner faces 5 of the metallic lateral walls 3, 4 are, in the optical confinement section 12, simply polished.

According to an embodiment illustrated in FIG. 3, the processing unit 1 comprises an attenuation section 15, inserted between the main section 9 and the confinement section 12, and in which the inner faces 5 of the lateral walls 3, 4 are both reflective and extend parallel to the pathway T of the preforms 2. In the example illustrated in FIG. 3, where the pathway T is essentially linear, the inner faces 5 of the lateral walls are flat and parallel.

The attenuation section 15 has the function of channeling toward the preforms 2 that are entering into (or exiting from) the main section 9 with the fraction of the radiation escaping from it. As FIG. 3 clearly shows, the lateral walls 3, 4 can, in the attenuation section 15, be formed by an inner portion 16 of the screens 13, situated on the side of the main section 9 of the chamber 6.

Also, the lateral walls 3, 4 can, in the confinement section 12, be formed by an intermediate portion 17 of the screens 13, angled relative to the inner portion 16.

The confinement section 12 has a dual function:
To reflect, toward the preforms 2 traveling in the confinement section 12, the residual radiation that, coming from the main section 9, has not been absorbed (whether in the main section 9 or, if applicable, in the attenuation section 15) by the preforms 2;
To redirect toward the main section 9 the non-absorbed fraction of radiation.

The following are denoted (see FIG. 4):
L as the length of the confinement section 12, measured along the pathway T,
A as the angle between the inner faces 5 of the lateral walls 3, 4 in the confinement section 12,
E as the spacing between the lateral walls 3, 4 in the main section 9, measured perpendicular to the tangent to the pathway T (and perpendicular to it when it is straight, as in the example illustrated in FIG. 3).

With the attenuation section 15 extending in a coplanar manner to the main section 9, E also corresponds to the spacing of the lateral walls 3, 4 in the attenuation section 15.

The angle A is advantageously between 1° and 90°, and preferably between 5° and 30°. In the example illustrated, the parameters L, A and E have the following approximate values: L≅155 mm; A≅15°; E≅100 mm.

Figure 4:
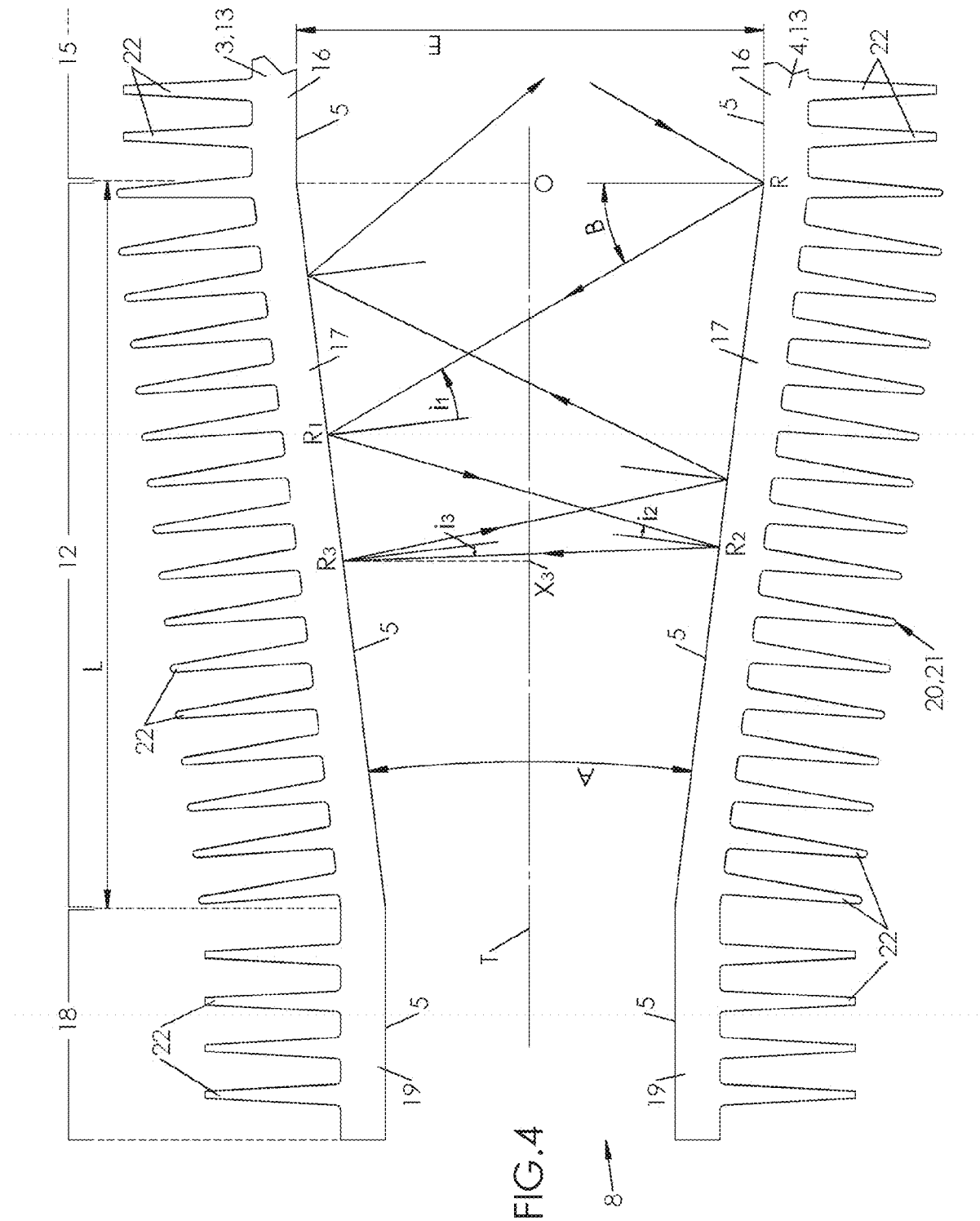
FIG. 4 is a partial cutaway view, to scale, of an optical confinement section of the processing unit of FIG. 1.

To better illustrate the operation of the confinement section 12, FIG. 4 illustrates the path of an incident ray coming from the main section 9 (after having optionally undergone successive reflections in the attenuation section 15) and entering into the confinement section 12. The hypothesis (unfavorable and temporary) is posited where the preforms 2 are absent, which corresponds in practice to the start-up (or preheating) of the processing unit 1, and the hypothesis (also unfavorable) where the incident ray enters into the confinement section 12 from a reflecting point R situated on an inner edge of it, on the side of the main section 9 (or the attenuation section 15).

The incident ray is angled, relative to the inner faces 5 of the walls 3, 4 in the main section 9 (or in the attenuation section 15), by an angle denoted B, so-called angle of origin. In the absence of preforms, the angle B of origin corresponds to the half-angle at the vertex (measured in a horizontal plane) of the light cone emitted by each source 10, assuming that they are all identical.

The incident ray is reflected successively by the inner faces 5 of the walls 3, 4 in the confinement section 12. Denoted as $R_N$ are the successive reflection points on each inner face, and as $i_N$ the corresponding angles of incidence, where N is an integer that is greater than or equal to 1.

Considering the rules of optical geometry, each angle $i_N$ of incidence is written in the following manner:

$$i_N = B - (2N-1)\frac{A}{2}$$

It is easily understood that, at the point $R_N$ corresponding to a zero or negative angle of incidence $i_N$, the ray is reflected in the direction of the main section 9.

Thus, for an angle A of 15° (which corresponds to the example provided above) and for an angle B of origin of 30°, it is observed that the ray undergoes three reflections in the direction of the opening 8, successively at $R_1$, $R_2$ and $R_3$, before being sent back, from $R_3$, toward the main section 9. The lines in FIG. 4 illustrate this configuration.

The length L of the confinement section 12 is preferably chosen so that any incident ray is effectively sent back toward the main section 9 before going beyond the confinement section 12.

Optical geometry can be used effectively to set the dimensions of the confinement section 12 accordingly. Nevertheless, it is also possible to set the dimensions of the confinement section 12 by calculation, by denoting the abscissa as $X_N$, measured along the pathway T, from the point $R_N$ from which the ray is sent back toward the main section 9, taking as the origin, denoted as O, the inner end (on the side of the main section 9 or the attenuation section 15) of the confinement section 12.

$X_N$ can be calculated approximately by the following formula:

$$X_N = \sum_{i=0}^{N-1} E_i \cdot \tan(B - i \cdot A)$$

where $E_i$ is defined in the following manner:

$$E_0 = E$$

$$E_{i+1} = E_i \cdot \left(1 - 2 \cdot \tan(B - iA) \cdot \tan\frac{A}{2}\right)$$

For values of A, B and L respectively of 15°, 30° and 100 mm, a geometric line makes it possible to measure the abscissa $X_3$ directly: it is equal to about 80 mm. The method of calculation described above provides an approximately identical value.

Consequently, it is seen, in this case, that a length L of 155 mm is sufficient. The calculations above make it possible to demonstrate that at an equal angle A, such a length L is sufficient to send back toward the main section 9, in theory, any ray whose angle B of origin is less than or equal to about 45°.

In practice, however, it can happen that a fraction of the radiation coming from the main section 9 is not sent back to it by the confinement section 12.

Firstly, it is possible that certain rays are diffracted by one or more preforms 2 (particularly in the vicinity of their outer face) at the point that the angle of incidence of the diffracted ray is such that this ray does not strike one of the inner faces 5 in the confinement section 12.

Secondly, as we have seen, the reflection of the incident light flow (coming from the main section 9) is not necessarily completely specular. Of course, it is possible to make the roughness of the inner faces 5 of the lateral walls 3, 4 in the confinement section 12 less than the wavelength of the light flow. Actually, in the infrared range, this wavelength is greater than or equal to 800 nm. Now, the modern techniques of polishing or of deposition (for example by cathode sputtering or simply sputtering) make it possible to obtain lower roughness levels, even much lower than this value. But particulates can, however, be deposited on the inner faces 5, and consequently lead to, at least locally, a partial or total diffuse reflection of the incident light flow.

To limit the risks that the light flow that is not reflected in a specular manner by the confinement section 12 cannot freely escape through the opening 8, it is consequently preferable to provide the chamber 6 with an absorption section 18, which extends between the optical confinement section 12 and the opening 8, and in which the inner faces 5 of the lateral walls 3, 4 are optically absorbent.

According to an embodiment illustrated in the figures, and in particular in FIGS. 3 and 4, in the absorbent section 18, the inner faces 5 of the lateral walls 3, 4 are approximately parallel, while being advantageously flat. In the absorption section, the optically absorbent character of the inner faces 5 can be obtained by a coating, such as a black paint. As a variant, in the absorption section 18, the inner faces 5 can be angled, for example, in the extension of the confinement section 12.

The absorption section 18 has the function of absorbing at least partially the possible portion of the radiation that would not have been sent back by the confinement section 12 to the main section 9, because of too great an angle of incidence due to, for example, a refraction on the periphery of one or more preforms 2, or because of a diffuse reflection on the inner faces 5 of the confinement section 12.

The absorption section 18 can be formed integrally with the confinement section 12. Thus, in the example illustrated in the figures, the lateral walls 3, 4 are, in the absorption section 18, formed by an outer portion 19 of the screens 13, which extends the intermediate portion 17 opposite the main section 9, up to the opening 8.

As we have already explained, the reflection obtained by the inner faces 5 of the lateral walls 3, 4 (in the confinement section 12 as in the attenuation section 15) is not necessarily specular to 100%. A portion of the light flow can be diffused. A portion of the light flow can also be absorbed by the lateral walls 3, 4. This gives rise to their heating up, which can cause a deformation of the inner faces 5, to the detriment of the quality of the reflection.

Therefore, it can be advantageous to regulate the temperature of the lateral walls 3, 4, at least in the confinement section 12 and, if applicable, in the attenuation section 15.

For this purpose, the processing unit 1 can be provided with a device 20 for cooling the lateral walls 3, 4, at least in the confinement section 12, and, for example, also in the attenuation section 15 as well as optionally in the absorption section 18.

This cooling device 20 comprises, for example, a radiator 21, designed to dissipate the calories absorbed by the lateral walls 3, 4. This radiator 21 can have refrigerating fluid circulation (for example with water). However, in the example illustrated, the radiator 21 has air circulation.

Thus, this radiator 21 comprises, for example, a row of fins 22 that extend vertically on the lateral walls 3, 4 opposite their inner faces 5, at least in the confinement section 12—and, in the example illustrated, also in the attenuation section 15. According to an embodiment that is not illustrated, fins 22 are also provided on the walls 3, 4 in the absorption section 18.

The cooling can be performed by natural convection, the upward movements of air between the fins 22 carrying away all or part of the calories produced. However, it is preferable, for reasons of efficiency, to perform the cooling by forced convection, which brings about a caloric transfer to the ambient air that is faster and therefore makes possible a more effective cooling of the lateral walls 3, 4.

Thus, according to an embodiment illustrated in the figures, and more particularly that can be seen in the cutaway of FIG. 5, the cooling device 20 comprises a ventilation system 23.

This system 23 comprises, for each radiator 21, on the one hand, a distribution channel 24 that extends along a lower edge 25 of the radiator 21 and opens toward it (i.e., upward), and, on the other hand, an air supply duct 26 which empties into the channel 24.

As illustrated in FIG. 5, and more particularly in its detailed inset, the channel 24 can comprise an inner wall 27 opposite which the duct 26 empties, this duct forming a deflector that makes it possible, on the one hand, to distribute the air flow along the lower edge 25 of the radiator 21, and, on the other hand, to deflect this flow (as illustrated by the arrow) so as to render it laminar to optimize the efficiency of the cooling.

The air supply duct 26 can be integral with the channel 24. As in the example illustrated, this duct 26 can appear in the form of a connection to which is coupled a tube 28 (flexible or rigid), which is only partially shown in FIG. 2, and which is connected furthermore to a forced fresh air source.

As FIGS. 2 and 5 clearly show, the processing unit 1 can be provided with a bottom panel 29 that extends horizontally by closing off the lateral walls 3, 4 at least in the confinement section 12 (and preferably also in the attenuation section 15 and in the absorption section 18).

This bottom panel 29 has an upper face 30 that can be optically absorbent (by being, for example, covered with a black paint) or preferably reflective (by being, for example, covered with an optically reflective covering such as a layer of gold, silver, or even aluminum—as a variant, the upper face 30 is polished, the bottom panel 29 being made of a metallic material, for example aluminum).

The bottom panel 29 makes it possible to absorb or reflect toward the preforms 2 the fraction of the radiation emitted (or refracted by the preforms 2) downward. In the first case, the function performed is solely safety-related, to protect the workers in the vicinity. In the second case, added to this safety function is also an increase in the efficiency of the processing unit 1 by re-emitting toward the preforms 2 a fraction of the radiation that could be lost.

The processing unit 1 that has just been described offers the following advantages.

First, thanks to its confinement section, the processing unit 1 makes it possible, in a simple and effective way, to improve the safety of the workers and to increase the efficiency of the heating.

Then, since the confinement section 12 ensures a reflection of an incident light flow toward the preforms 2, the portion of radiation lost is minimized, which makes it possible to optimize the use of the radiation emitted by the sources 10.

Further, since the confinement section 12 has no moving part, no mechanical wear is of concern, which makes it possible to minimize maintenance actions.

Finally, thanks in particular to a good surface condition of the inner faces 5 of the lateral walls 3, 4 at least in the confinement section 12, and in the absence of thermal cycles in continuous operation, the processing unit 1 exhibits a good resistance to thermal fatigue.

Various variants of embodiment can be envisioned. For convenience, these variants have been gathered together in FIG. 6.

Thus, according to a first variant, and as is mentioned above, the pathway T of the preforms 2 in the chamber is curved and not linear. In the example illustrated, the pathway T forms locally, in the main section 9, an arc.

According to a second variant, at least one of the walls 3, 4 does not have, in the main section 9, a continuous inner face 5: this inner face 5 can be in the shape of a stairway by following the curved pathway T of the preforms 2. For this purpose, as illustrated, the individual heating modules 11 can be offset relative to one another.

According to a third variant, only one wall 3 is, in the main section 9, provided with radiation sources 10, the other wall 4 simply being reflective.

According to a fourth variant, the processing unit 1 comprises at least one screen 31 that is outside of the chamber 6, this screen 31 having an optically absorbent inner face 32 positioned opposite the opening 8. This arrangement is feasible when the pathway T of the preforms upstream (or downstream) from the opening 8 undergoes a deflection at least in some areas, the outer screen 31 being placed in the extension of the pathway T followed by the preforms in the confinement section 12. This outer screen 32 makes it possible to absorb the fraction of the radiation that is not reflected toward the main section 9 by the confinement section 12 and that is not absorbed by the absorption section 18. This results in improved safety of the processing unit 1 for the workers in the vicinity.

The invention claimed is:

1. Unit (1) for processing hollow-body blanks (2) of plastic material, which comprises a chamber (6) in which the blanks (2) advance by following a predetermined pathway (T), this chamber (6) being delimited on both sides of the pathway (T) by two lateral walls (3, 4) having opposing inner faces (5), this chamber (6) comprising a main section (9) in which at least one of the walls (3, 4) is provided with numerous sources (10) of electromagnetic radiation, the lateral walls (3, 4) defining between themselves, at at least one end of the chamber, an opening (8) for the passage of the blanks (2), this chamber (6) further comprising at least one optical confinement section (12), which extends between the main section (9) and the opening (8), and in which the inner faces (5) of the lateral walls (3, 4) are optically reflective and converging in the direction of the opening (8), wherein the chamber (6) comprises an absorption section (18), which extends between the optical confinement section (12) and the opening (8), and in which the inner faces (5) of the lateral walls (3, 4) are optically absorbent.

2. Processing unit (1) according to claim 1, wherein, in the optical confinement section (12), the inner faces (5) of the lateral walls (3, 4) are flat.

3. Processing unit (1) according to claim 2, wherein, in the optical confinement section (12), the inner faces (5) of the lateral walls (3, 4) define between themselves an angle (A) of between 1° and 90°.

4. Processing unit (1) according to claim 3, wherein, in the optical confinement section (12), the inner faces (5) of the lateral walls (3, 4) define between themselves an angle (A) of between 5° and 30°.

5. Processing unit (1) according to claim 4, wherein, in the optical confinement section (12), the inner faces (5) of the lateral walls (3, 4) define between themselves an angle (A) of about 15°.

6. Processing unit (1) according to claim 1, wherein, in the absorption section (18), the inner faces (5) of the lateral walls (3, 4) are approximately parallel.

7. Processing unit (1) according to claim 1, wherein, in the absorption section (18), the inner faces (5) of the lateral walls (3, 4) are flat.

8. Processing unit (1) according to claim 1, wherein the processing unit is provided with a device (20) for cooling the lateral walls (3, 4), at least in the confinement section (12).

9. Processing unit (1) according to claim 8, wherein the cooling device (20) comprises a radiator (21).

10. Processing unit (1) according to claim 9, wherein the radiator (21) comprises a row of fins (22) that extend vertically on the lateral walls (3, 4) opposite their inner faces (5), at least in the confinement section (12).

11. Processing unit (1) according to claim 9, wherein the cooling device (20) comprises a ventilation system (23) that includes, for each radiator (21), a distribution channel (24) that extends along a lower edge (25) of the radiator (21) and opens toward it, and an air supply duct (26) which empties into the channel (24).

12. Processing unit (1) according to claim 1, wherein the sources (10) are laser diodes.

13. Processing unit (1) according to claim 1, further comprising at least one screen (31) outside of the chamber (6), having an optically absorbent inner face (32) positioned opposite the opening (8).

14. Processing unit (1) according to claim 10, wherein the cooling device (20) comprises a ventilation system (23) that includes, for each radiator (21), a distribution channel (24)

that extends along a lower edge (25) of the radiator (21) and opens toward it, and an air supply duct (26) which empties into the channel (24).

\* \* \* \* \*